(12) United States Patent
Wilsher et al.

(10) Patent No.: US 8,760,731 B2
(45) Date of Patent: Jun. 24, 2014

(54) DOCUMENT SCANNER, AN ASSOCIATED METHOD OF OPERATING A DOCUMENT SCANNER, AND AN ASSOCIATED PROGRAM STORAGE DEVICE

(75) Inventors: Michael J. Wilsher, Letchworth (GB); Christopher D. Olliffe, Berkhamsted (GB); David W. Thorne, Shefford (GB); Paul S. Golding, Hertford (GB)

(73) Assignee: Xerox Corporation, Norwalk, CT (US)

( * ) Notice: Subject to any disclaimer, the term of this patent is extended or adjusted under 35 U.S.C. 154(b) by 417 days.

(21) Appl. No.: 13/075,437

(22) Filed: Mar. 30, 2011

(65) Prior Publication Data
US 2012/0250108 A1  Oct. 4, 2012

(51) Int. Cl.
*H04N 1/04* (2006.01)

(52) U.S. Cl.
USPC ............ 358/475; 358/497; 358/486; 358/474

(58) Field of Classification Search
CPC .............. H04N 1/02815; H04N 1/193; H04N 1/40056; H04N 2201/02868; H04N 1/1013; H04N 1/17; H04N 1/0402; H04N 1/12; H04N 1/1017; H04N 2201/1016; H04N 2201/0425; H04N 1/484
USPC ............ 355/25; 358/475, 497, 494, 474, 488, 358/486, 483, 482, 401, 501, 505, 509; 399/379, 380, 211, 212; 250/234–236, 250/208.1, 216, 239; 382/312, 318, 319
See application file for complete search history.

(56) References Cited

U.S. PATENT DOCUMENTS

| 4,506,301 | A | 3/1985 | Kingsley et al. |
| 4,748,514 | A | 5/1988 | Bell |
| 5,001,511 | A | 3/1991 | Katoh et al. |
| 5,029,020 | A | 7/1991 | Norder et al. |
| 5,250,981 | A | 10/1993 | Greene |
| 5,532,845 | A | 7/1996 | Gusmano |
| 5,726,775 | A * | 3/1998 | Walsh ........................... 358/488 |
| 5,969,826 | A | 10/1999 | Dash et al. |
| 6,603,580 | B1 * | 8/2003 | Taillie ........................... 358/474 |
| 6,850,730 | B2 * | 2/2005 | Adams ........................... 399/380 |
| 6,882,822 | B2 * | 4/2005 | Gomi et al. ................... 399/380 |
| 6,952,290 | B2 * | 10/2005 | Ishido et al. .................. 358/475 |
| 7,471,424 | B2 * | 12/2008 | Ishido et al. .................. 358/449 |
| 8,310,736 | B2 * | 11/2012 | Nakajima ..................... 358/474 |
| 2004/0234311 | A1 | 11/2004 | Adams |

(Continued)

FOREIGN PATENT DOCUMENTS

JP  2003152959 A * 5/2003

*Primary Examiner* — Cheukfan Lee
(74) *Attorney, Agent, or Firm* — Gibb & Riley, LLC (57) ABSTRACT

Disclosed are embodiments of document scanner, a method and a program storage device wherein the scan mode is automatically adjusted to fall within standards established to prevent vision damage and/or discomfort and to still allow for high-resolution scanning. Specifically, the platen cover of the document scanner can be operatively connected to the scan carriage such that the mode at which the scan carriage operates depends upon the detected position of the platen cover. When the platen cover is closed, the scan carriage can automatically illuminate the document being scanned at a relatively high light intensity level and can move at a relatively fast speed. When the platen cover is opened, the scan carriage can automatically illuminate the document being scanned at a lower light intensity level and, optionally, can move at a slower speed to compensate for the lower light intensity level.

20 Claims, 4 Drawing Sheets

(56) References Cited

U.S. PATENT DOCUMENTS

2005/0140991 A1* 6/2005 Ogiwara et al. ............... 358/1.2
2008/0030806 A1  2/2008 Amarakoon et al.
2009/0323131 A1* 12/2009 Toyoda .......................... 358/448
2013/0044334 A1*  2/2013 Igawa et al. ................... 356/635
2013/0044357 A1*  2/2013 Igawa et al. ................... 358/474

* cited by examiner

DOCUMENT SCANNER, AN ASSOCIATED METHOD OF OPERATING A DOCUMENT SCANNER, AND AN ASSOCIATED PROGRAM STORAGE DEVICE

BACKGROUND

The embodiments disclosed herein generally relate to document scanning and, more particularly, to a document scanner, an associated method of operating a document scanner, and an associated program storage device wherein the scan mode and, particularly, the light intensity level to scan rate setting, of the document scanner is automatically adjusted, as necessary, to fall within legal requirements and/or recommendations established to prevent vision damage and/or discomfort and still allow for high-resolution scanning.

Generally, a document scanner converts images and/or text on a hardcopy of a document into electronic form. The document scanning process involves placing the document on a top surface of a transparent platen (i.e., a transparent flat plate). A scan carriage is then moved passed the document along the bottom surface of the platen. The scan carriage includes a light source that illuminates the document and, particularly, the images and/or text thereon. The carriage also includes an image sensor, which incorporates photosensitive devices (e.g., photodiodes or other photosensitive devices) that measure the intensity of light reflected from given areas of the document. The sensor data is then translated from analog to digital, thereby defining the picture elements (i.e., pixels) of the document being scanned. Combined these pixels represent the document in electronic form.

Technology advancements in this area have been driven by customer requirements for high-speed, high-resolution, document scanning. Increasing the scan rate of a document scanner (i.e., the speed at which the scanner carriage moves past the document) typically results in a corresponding decrease in the sensing time available to the photosensitive devices and, thereby a corresponding decrease in the resulting image resolution. Additionally, the drive for smaller optics and smaller sensors leads to less efficient light collection and smaller photosites which are less sensitive and, thereby a corresponding decrease in the resulting image resolution. To compensate for decreases in image resolution due to increases in scan speed and/or decreases in smaller optics and sensors, the intensity level of the light that illuminates the document can be increases. As a result, good signal to noise figures and, thereby acceptable images can be achieved in less time using smaller optics and sensors.

Unfortunately, the light intensity levels being used in the newer technology high-speed, high-resolution, document scanners can, depending upon the exposure time, fall outside legal requirements and/or recommendations established to prevent vision damage and/or discomfort. While this, for the most part, is not an issue when the platen cover of the document scanner is closed (e.g., when a document handling system automatically feeds single sheets onto the platen for scanning or when a user places a single sheet on the platen for scanning and closes the cover) as the light is shielded from the user, exposure to high intensity light can become an issue when the platen cover is partially or fully open (e.g., when book is opened on the platen for scanning and prevents the platen cover from closing completely). Therefore, there is a need in the art for a document scanner, an associated method of operating a document scanner and an associated program storage device wherein the scan mode and, more particularly, the light intensity level to scan rate setting, of the document scanner is automatically adjusted, as necessary, to fall within legal requirements and/or recommendations established to prevent vision damage and/or discomfort and still allow for high-resolution scanning.

SUMMARY

In view of the foregoing, disclosed herein are embodiments of a high speed, high resolution, document scanner wherein the scan mode and, more particularly, the light intensity level to scan rate setting, of the document scanner is automatically adjusted, as necessary, to fall within legal requirements and/or recommendations established to prevent vision damage and/or discomfort and to still allow for high-resolution scanning. Specifically, in the embodiments of the document scanner, the platen cover can be operatively connected to the scan carriage such that the mode at which the scan carriage operates depends upon the detected position of the platen cover. For example, when the platen cover is closed, the scan carriage can automatically illuminate the document being scanned at a relatively high light intensity level and can move at a relatively fast speed. However, when the platen cover is opened, the scan carriage can automatically illuminate the document being scanned at a lower light intensity level and, optionally, in order to compensate for the lower light intensity level and achieve essentially the same signal to noise and resolution, can move at a slower speed. Also disclosed herein are embodiments of an associated method of operating a scanner and a program storage device.

More particularly, disclosed herein are embodiments of a document scanner. This document scanner can comprise a platen on a frame. The platen can have a top surface for supporting a document and a bottom surface opposite the top surface. A scan carriage for scanning the document can be movably mounted within the frame adjacent to the bottom surface of the platen. Additionally, a platen cover can be pivotably mounted to the frame and can be operatively connected to the scan carriage so that the scan carriage automatically scans the document in a different mode (i.e., either a first scan mode or a second scan mode) depending upon the position of the platen cover (i.e., a first position or a second position, respectively).

Specifically, a detection system (e.g., a switch or sensor) can detect a position of the platen cover relative to the platen. That is, the detection system can detect when the platen cover is in either a first position or a second position that is different from the first position. The first position can be when the platen cover is closed over the document such that it is essentially parallel to the platen and the second position can be when the platen cover is at least partially opened such that the platen cover is angled relative to the platen. The detection system can further communicate that detected position to the scan carriage in order to enable either the first scan mode or the second scan mode, as appropriate. For example, the first scan mode can be a default scan mode and the switch or sensor of the detection system can be activated when the platen cover is in the second position (e.g., at least partially opened) and can trigger transmission of an enable signal to initiate the second scan mode. Alternatively, the second scan mode can be the default scan mode and the switch or sensor of the detection system can be activated when the platen cover is in the first position (e.g., closed) and can trigger transmission of an enable signal that initiates the first scan mode.

The different scan modes can require the scan carriage to illuminate the document at different light intensity levels and, optionally, to move at different scan rates. For example, the first scan mode, which can be automatically initiated when the platen cover is in the first position (e.g., closed), can require the scan carriage to illuminate the document at a first light intensity level and to move along the bottom surface of the platen at a first scan rate. Whereas, the second scan mode, which can be automatically initiated when the platen cover is in the second position (e.g., at least partially opened), can require the scan carriage to illuminate the document at a second light intensity level (e.g., an acceptable light intensity level for user exposure according to pre-established standards) that is less than the first light intensity level. The second scan mode can also require the scan carriage to move along the bottom surface of the platen at either the first scan rate at the expense of image resolution (i.e., accepting a reduction in signal to noise) or at a second scan rate that is slower than the first scan rate in order to compensate for the lower intensity light and, thereby achieve essentially the same image resolution.

To accomplish the different scan rates, if applicable, and the different light intensity levels, the scan carriage can have a variable speed drive motor and can comprise a light source, which is connected to a variable power supply. In the first scan mode, the variable speed drive motor can operate at a first operating speed in order to achieve the first scan rate and the light source can receive, from the variable power supply, a first amount of power in order to achieve the first light intensity level. Whereas, in the second scan mode, the variable speed drive motor can operate at a second operating speed that is slower than the first operating speed in order to achieve the second scan rate and the light source can receive, from the variable power supply, a second amount of power that is less than the first amount of power in order to achieve the second light intensity level.

The document scanner can further comprise one or more access panels (e.g., in the frame and/or in a document handling system incorporated into the platen cover), which, when opened, may expose a user to light from the scan carriage. Optionally, the access panel(s) can also be operatively connected to the scan carriage so that the scan carriage automatically scans the document in the first scan mode, as discussed above, when both the following conditions occur: (1) the platen cover is in the first position (e.g., closed) and (2) all of the access panels are also closed and so that the scan carriage automatically scans the document in the second scan mode, as discussed above, when either one of the following conditions occur: (1) the platen cover is in the second position (e.g., at least partially opened) or (2) any of the access panels are opened.

Also disclosed herein are embodiments of a method of operating a document scanner. The method embodiments can comprise receiving an indication of a detected position of a platen cover relative to a platen that supports a document to be scanned by the document scanner. This detected position can be either a first position (e.g., when the platen cover is closed over the document such that it is essentially parallel to the platen) or a second position different from the first position (e.g., when the platen cover is at least partially opened such that the platen cover is angled relative to the platen). Next, the method can comprise automatically scanning the document in a first scan mode when the detected position is the first position (e.g., closed) and in a second scan mode different from the first scan mode when the detected position is the second position (e.g., at least partially opened).

For example, the first scan mode can comprise a default scan mode and the process of receiving an indication of the position of the platen cover can comprise receiving an enable signal triggered by a detection system when the platen cover is in the second position (e.g., at least partially opened). This enable signal can then initiate the second scan mode. Alternatively, the second scan mode can comprise the default scan mode and the process of receiving an indication of the position of the platen cover can comprise receiving an enable signal triggered by a detection system when the platen cover is the first position (e.g., closed). In this case, the enable signal initiates the first scan mode.

The different scan modes can require a scan carriage component of the document scanner to illuminate a document at different light intensity levels and, optionally, to move at different scan rates. For example, the first scan mode, which can be automatically initiated when the platen cover is in the first position (e.g., closed), can require the scan carriage to illuminate the document at a first light intensity level and to move along the bottom surface of the platen at a first scan rate. Thus, the process of automatically scanning the document in the first scan mode can comprise, for example, supplying a light source in the scan carriage with a first amount of power from a variable power supply in order to achieve the first light intensity level and further selectively operating a drive motor (e.g., a variable drive motor) for the scan carriage at a first operating speed in order to achieve the first scan rate. Whereas, the second scan mode, which can be automatically initiated when the platen cover is in the second position (e.g., at least partially opened), can require the scan carriage to illuminate the document at a second light intensity level (e.g., an acceptable light intensity level for user exposure according to pre-established standards) that is less than the first light intensity level. The second scan mode can also require the scan carriage to move along the bottom surface of the platen at either the first scan rate at the expense of image resolution (i.e., accepting a reduction in signal to noise) or at a second scan rate that is slower than the first scan rate in order to compensate for the lower intensity light and, thereby achieve essentially the same image resolution. Thus, the process of automatically scanning the document in the second scan mode can comprise supplying the light source with a second amount of power from the variable power supply, the second amount of power being less than the first amount of power in order to achieve the second light intensity level and, if applicable, selectively operating the variable drive motor at a second operating speed that is slower than the first operating speed in order to achieve the second scan rate.

Optionally, the method can further comprise receiving another indication that an access panel for the document scanner (e.g., an access panel in the frame and/or in a document handling system incorporated into the platen cover, which, when opened, may expose a user to light from the scan carriage) is either closed or opened. In this case, the process of automatically scanning the document can comprise automatically scanning the document in the first scan mode, as discussed above, when both the following conditions occur: (1) the platen cover is in the first position (e.g., closed) and (2) the access panel is closed and automatically scanning the document in the second scan mode, as discussed above, when either one of the following conditions occur: (1) the platen cover is in the second position (e.g., at least partially opened) and (2) the access panel is opened.

Also disclosed herein are embodiments of a computer program product. One embodiment of the computer program product can comprise a non-transitory program storage device. This program storage device can be readable by a computer and, particularly, a controller for the document scanner and can tangibly embody a program of instructions executable by the controller to perform the above-describe method of operating a document scanner.

These and other features are described in, or are apparent from, the following detailed description.

BRIEF DESCRIPTION OF THE SEVERAL VIEWS OF THE DRAWINGS

The embodiments disclosed herein will be better understood from the following detailed description with reference to the drawings, which are not necessarily drawn to scale and in which.

DETAILED DESCRIPTION

The embodiments of the invention and the various features and advantageous details thereof are explained more fully with reference to the non-limiting embodiments that are illustrated in the accompanying drawings and detailed in the following description.

As mentioned above, the light intensity levels being used in the newer technology high-speed, high-resolution, document scanners can, depending upon the exposure time, fall outside legal requirements and/or recommendations established to prevent vision damage and/or discomfort. Specifically, conventional document scanners are typically operated with a scan rate of up to 60 sheets per minute (or 1 sheet per second) using a light source that provides illumination at approximately 30,000 lux. However, newer technology high-speed, high-resolution, document scanners often operate with a scan rate of up to or in excess of 120 sheets per minute (or 1 sheets per half second) and require a light source that provides illumination of approximately 150,000 lux.

Figure 1:
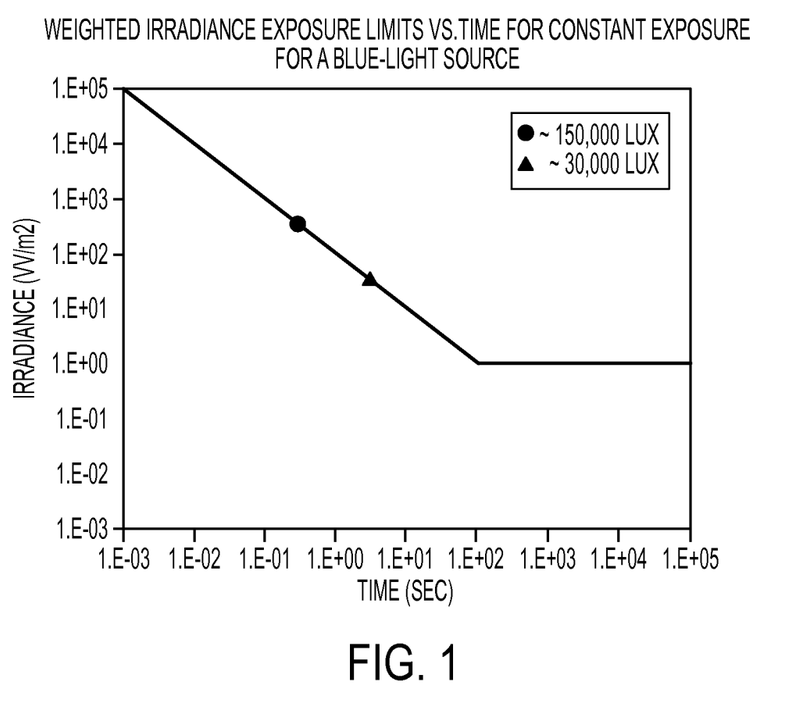
FIG. 1 is graphed curve illustrating, for a typical blue-light source used in document scanners, the acceptable periods of user exposure to various irradiance levels.

Those skilled in the art will recognize that lux is a photometric unit and it is the standard unit of measurement for light intensity (also referred to as illuminance). Lux is analogous to Watts/inch$^2$, a radiometric unit used to measure irradiance. The primary difference between these units is that radiometric units consider all wavelengths equally, whereas photometric units consider how different wavelengths are perceived by the human eye. Since the human eye is more sensitive to some wavelengths than others, different conversion factors are used to convert radiometric units, such as Watts per square inch, to photometric units, such as lux. FIG. 1 is graphed curve illustrating, for a typical blue-light source used in document scanners, the acceptable periods of user exposure to various irradiance levels. FIG. 1 further indicates where on that curve approximately 30,000 lux and approximately 150,000 lux fall. As illustrated, the recommended safe exposure time for a blue light at approximately 30,000 lux is 5-10 seconds. Thus, conventional document scanners generally operate within safety guidelines. However, the recommended safe exposure time for blue light is reduced to less than a second at approximately 150,000 lux. While such high intensity light is, for the most part, not an issue when the platen cover of a high speed, high resolution, document scanner is closed (e.g., when a document handling system automatically feeds single sheets onto the platen for scanning or when a user places a single sheet on the platen for scanning and closes the cover), exposure to high intensity light can become an issue when the platen cover is partially or fully open (e.g., when book is opened on the platen for scanning and prevents the platen cover from closing completely).

In view of the foregoing, disclosed herein are embodiments of a high speed, high resolution, document scanner wherein the scan mode and, more particularly, the light intensity level to scan rate setting, of the document scanner is automatically adjusted, as necessary, to fall within legal requirements and/or recommendations established to prevent vision damage and to still allow for high-resolution scanning. Specifically, in the embodiments of the document scanner, the platen cover can be operatively connected to the scan carriage such that the mode at which the scan carriage operates depends upon the detected position of the platen cover. For example, when the platen cover is closed, the scan carriage can automatically illuminate the document being scanned at a relatively high light intensity level and can move at a relatively fast speed. However, when the platen cover is opened, the scan carriage can automatically illuminate the document being scanned at a lower light intensity level and, optionally, in order to compensate for the lower light intensity level and achieve essentially the same high resolution, can move at a slower speed. Also disclosed herein are embodiments of an associated method of operating a scanner and a program storage device.

Figure 2A:
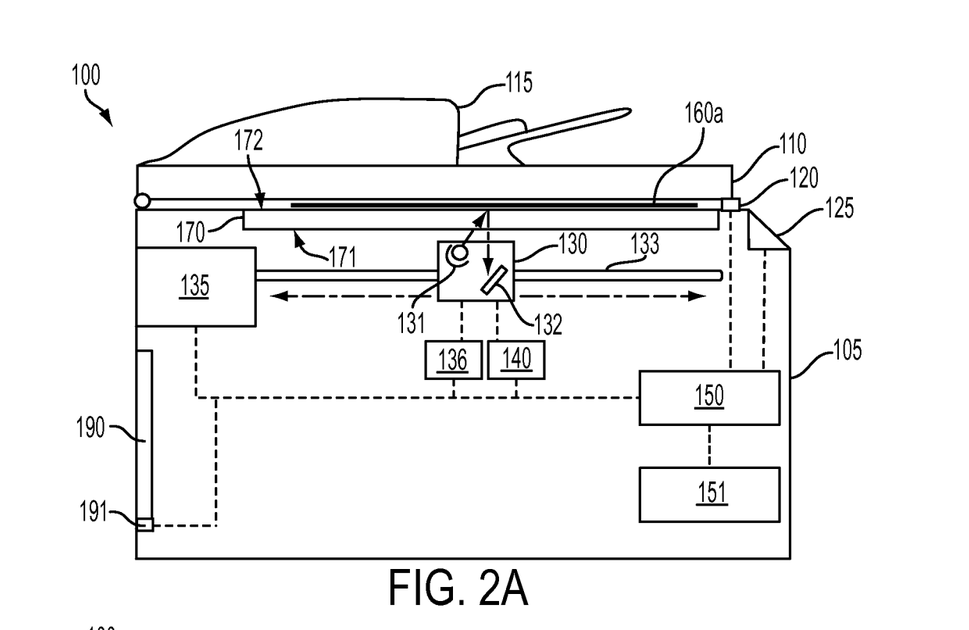
FIG. 2A is a schematic drawing illustrating an embodiment of a document scanner with the platen cover in a first position (e.g., closed)
Figure 2B:
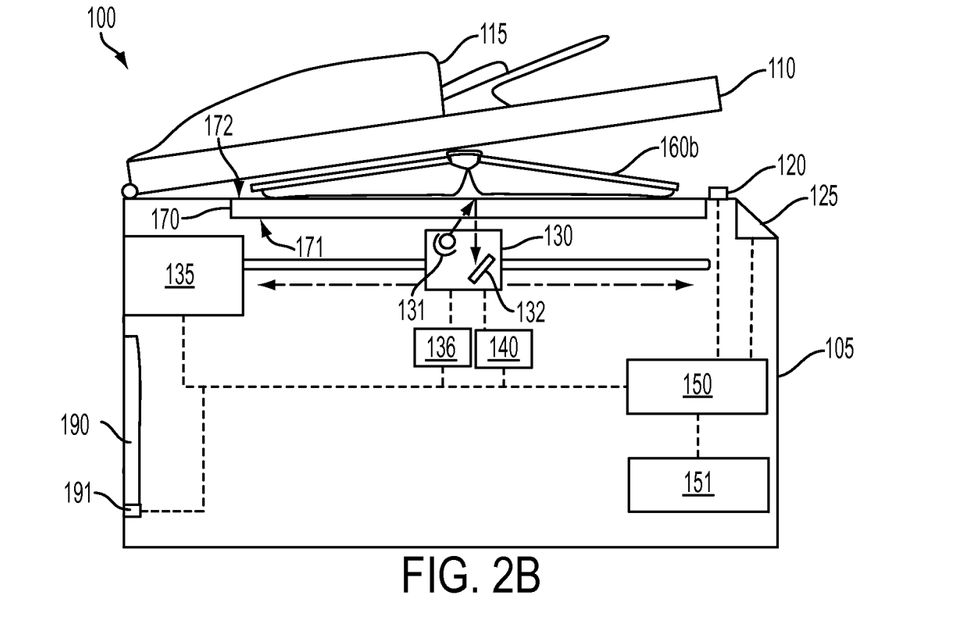
FIG. 2B is a schematic drawing illustrating the same document scanner with the platen cover in a second position (e.g., at least partially opened)

More particularly, referring to FIGS. 2A-2B, disclosed herein are embodiments of a high speed, high resolution, document scanner 100. The document scanner 100 can comprise at least a frame 105, a transparent platen 170 for receiving and supporting a document to be scanned (e.g., a sheet 160a of paper or other material, as shown in FIG. 2A; adjacent pages 160b in an opened book, as shown in FIG. 2B; or any other media suitable for scanning), a platen cover 110 for covering the platen 170, a detection system 120 for detecting the position of the platen cover 110, a scan carriage 130 for scanning the document, a drive motor 135 for driving the scan carriage 130 during scanning and a controller 150.

The controller 150 can be operatively connected to the other scanner components and can control the operation of these components, as described in detail below. This controller 150 can comprise, for example, a programmable, self-contained, dedicated mini-computer having a central processor unit (CPU), electronic storage, and a display or user interface (UI) 125.

The transparent platen 170 (i.e., a transparent or light-transmissive flat plate) can be mounted on the frame 105. The transparent platen 170 can have a top surface 172 that receives and supports a document (e.g., 160a or 160b) and a bottom surface 171 opposite the top surface 172.

The scan carriage 130 can be movably mounted within the frame 105 adjacent to the bottom surface 171 of the transparent platen 170. For example, the scan carriage 130 can be supported for horizontal movement within the frame 105 by parallel supports (e.g., parallel tracks or rails mounted on the sidewalls of the frame 105). To impart a scanning motion, a reversible drive motor 135 can also be mounted on the frame 105 (e.g., at one end of the supports). The drive motor 135 can be operatively connected to a drive screw 133, as shown, so as to rotate the screw 133 in either a clockwise or counter clockwise direction. The drive screw 133 can run parallel to the supports and can be threadedly engaged to the scan carriage 130 so that clockwise rotation of the screw 133 causes the scan carriage 130 to move along the supports and, thereby the bottom surface 171 of the platen 170 in one direction and so that counterclockwise rotation of the screw 133 causes the scan carriage 130 to move along the supports and, thereby the bottom surface 171 of the platen 170 in the opposite direction. Alternatively, the drive motor 135 can be operatively connected to a drive belt, which in turn is operatively connected to the scan carriage 130, so that rotation of the drive belt similarly causes the scan carriage 130 to move along the supports and, thereby the bottom surface 171 of the platen 170. Alternatively, the drive motor 135 can be operatively connected to any other mechanism that causes the scan carriage 130 to move along the supports and, thereby the bottom surface 171 of the platen 170. Various assemblies that provide for horizontal movement of a scan carriage within a flatbed document scanner are well-known in the art (e.g., see U.S. Pat. No. 4,506,301 of Kingsley et al., issued on Mar. 19, 1985, U.S. Pat. No. 4,748,514 of Bell, issued on May 31, 1988, and U.S. Pat. No. 5,029,020 of Norder et al., issued on Jul. 2, 1991, each of which were assigned to Xerox Corporation and incorporated herein by reference) and, thus, the specific details of such assemblies are omitted from this specification in order to allow reader to focus on the salient aspects of the invention.

The scan carriage 130 can further comprise a light source 131 (e.g., a light emitting diode (LED) light source) and an image sensor 132. During a scan process, as the scan carriage 130 is moved, by the drive motor 135, along the supports passed the bottom surface 171 of the platen 170, the light source 131 can illuminate the document (e.g., 160a or 160b) and, particularly, the images and/or text thereon. The image sensor 132 can comprise an array of photosensitive devices (e.g., photodiodes or other photosensitive devices) that can measure the intensity of light reflected from given areas of the document. The sensor data can then translated from analog to digital (e.g., by discrete processor 140 or by a controller 150), thereby defining the picture elements (i.e., pixels) of the document being scanned. Combined these pixels represent the document in electronic form.

The platen cover 110 can be pivotably mounted (e.g., by one or more hinges) to the frame 105 and can be configured to cover the top surface 172 of the platen 170 when closed, as shown in FIG. 2A, and to expose the top surface 172 of the platen 170, allowing a document to be placed thereon, when opened, as shown in FIG. 2B. Optionally, the platen cover 110 can incorporate a document handling system 115. The document handling system 115 can comprise an input tray for holding sheets of paper prior to scanning, an output tray form holding sheets of paper after scanning and a sheet feeding mechanism which moves sheets individually onto the platen 170 from the input tray and, once scanning is complete, off the platen 170 into the output tray. Various document handling systems that are incorporated into platen covers are well-known in the art (e.g., see U.S. Pat. No. 4,506,301 of Kingsley et al., issued on Mar. 19, 1985; U.S. Pat. No. 5,250,981 of Greene, issued on Oct. 5, 1993; and U.S. Pat. No. 5,969,826 of Dash et al., issued on Oct. 19, 1999, each of which were assigned to Xerox Corporation and are incorporated herein by reference) and, thus, the specific details of such document handling systems are omitted from this specification in order to allow reader to focus on the salient aspects of the invention.

The platen cover 110 can further be operatively connected to the scan carriage 130 so that the scan carriage 130 automatically scans a document (e.g., 160a or 160b) in a different mode (i.e., either a first scan mode or a second scan mode) depending upon the position of the platen cover 110 (i.e., a first position or a second position, respectively) relative to the platen 170.

Specifically, a detection system 120 comprising, for example, a switch or optical or mechanical sensor, can detect the position of the platen cover 110 relative to the platen 170. That is, the detection system 120 can detect when the platen cover 110 is in either a first position or a second position that is different from the first position. As shown in FIG. 2A, the first position can be when the platen cover 110 is closed over the document 160a such that it is essentially parallel to the platen 170. This first position can be associated with operation of the document handling system 115, which, as discussed above, feeds sheets individually onto and off of the platen 170 for scanning. This first position can also be associated with a user manually placing a single sheet or a relatively thin stack of sheets (e.g., a few documents stapled together) on the platen 170 and closing it. In this case, the position of the platen cover 110 is sufficient to protect a user from exposure to light and, particularly, high intensity light. As shown in FIG. 2B, the second position can be when the platen cover 110 is at least partially opened such that the platen cover 110 is angled (e.g., at 5 degrees 10 degrees, 25 degrees, 45 degrees, 90 degrees, etc.) relative to the platen 170. This second position can be associated with a user manually placing an open book, as shown, or a relatively thick stack of sheets on the platen 170 and attempting to close it. In this case, the position of the platen cover 110 may be insufficient to protect a user from exposure to light and, particularly, high intensity light (e.g., up to or greater than 150,000 lux), which at even short exposure times can cause vision damage during scanning.

The detection system 120 can further communicate that detected position to the scan carriage 130 in order to enable either the first scan mode or the second scan mode, as appropriate. In one embodiment, the first scan mode can be a default scan mode (i.e., the mode that is used absent instructions to the contrary) and the switch or sensor of the detection system 120 can be activated when the platen cover 110 is in the second position (e.g., at least partially opened) and can trigger transmission of an enable signal (e.g., to the controller 150) to initiate the second scan mode. In another embodiment, the second scan mode can be the default scan mode (i.e., the mode that is used absent instructions to the contrary) and the switch or sensor of the detection system 120 can be activated when the platen cover 110 is in the first position (e.g., closed) and can trigger transmission of an enable signal (e.g., to the controller 150) that initiates the first scan mode. Such detection systems that trigger enable signals are well-known in the art (e.g., see U.S. Pat. No. 4,506,301 of Kingsley et al., issued on Mar. 19, 1985, assigned to Xerox Corporation and are incorporated herein by reference) and, thus, the specific details of such document handling systems are omitted from this specification in order to allow reader to focus on the salient aspects of the invention.

The different scan modes can require the scan carriage 130 to illuminate the document at different light intensity levels and, optionally, to move at different scan rates. For example, the first scan mode, which can be automatically initiated by the controller 150 when the platen cover 110 is in the first position (e.g., closed, as shown in FIG. 2A), can require the scan carriage 130 to illuminate the document at a first light intensity level and to move along the bottom surface 171 of the platen 170 at a first scan rate. Since the platen cover 110 is in the closed position and, thereby limits user exposure to light during scanning, the first scan mode can, for example, correspond to the scan operation performed by newer technology high-speed, high-resolution, document scanners. Thus, in one exemplary embodiment, the first scan mode can require a first scan rate of approximately 120 sheets per minute (or 1 sheet per half second) and further require a light intensity level of approximately 150,000 lux. However, it should be understood that the first scan mode may alternatively require a first scan rate that is faster or slower than 120 sheets per minute and/or a first light intensity level that is higher or lower than 150,000 lux.

On the other hand, the second scan mode, which can be automatically initiated by the controller 150 when the platen cover 110 is in the second position (e.g., at least partially opened, as shown in FIG. 2B), can require the scan carriage 130 to illuminate the document at a second light intensity level that is less than the first light intensity level. Since the platen cover 110 is in the opened position and, thereby may allow a user to be exposed to light during scanning, the second scan mode should meet pre-established standards for light intensity level to user exposure time to prevent vision damage and/or discomfort. It should be noted that such pre-established standards may, for example, be legal requirements and/or recommendations generated by one or more governmental agencies (e.g., Occupational Safety and Health Administration (OSHA), National Eye Institute (NEI) of the National Institutes of Health (NIH), etc.) or a private or non-profit organization (e.g., American Optometric Association). In addition, the second scan mode can require the scan carriage 130 to move either at the same first scan rate at the expense of image resolution (i.e., accepting a reduction in signal to noise) or, optionally, to move at a second scan rate that is slower than the first scan rate in order to compensate for the decrease in light intensity and, thereby achieve essentially the same image resolution. Thus, in one exemplary embodiment, the second scan mode can require a second scan rate of approximately 60 sheets per minute (or 1 sheet per second) and further require a light intensity level of approximately 30,000 lux, which as illustrated in FIG. 1 is currently accepted as being within established safety standards. However, it should be understood that the second scan mode may alternatively require a second scan rate that is faster or slower than 60 sheets per minute and/or a second light intensity level that is higher or lower than 30,000 lux (e.g., if within the pre-established standards).

To accomplish the different scan rates, if applicable, and the different light intensity levels, the drive motor 135 can comprise, for example, a variable speed drive motor 135 and the light source 131 can comprise, for example, a light emitting diode (LED) light source connected to a variable power supply 136. In the first scan mode, the controller 150 can cause the variable speed drive motor 135 to operate at a first operating speed in order to achieve the first scan rate and can further cause the light source 131 to receive, from the variable power supply 136, a first amount of power in order to achieve the first light intensity level. Whereas, in the second scan mode, the controller 150 can cause the variable speed drive motor 135 to operate at a second operating speed that is slower than the first operating speed in order to achieve the second scan rate and can further cause the light source 131 to receive, from the variable power supply 136, a second amount of power that is less than the first amount of power in order to achieve the second light intensity level.

The document scanner 100 can further comprise one or more access panels 190 (e.g., in the frame and/or in a document handling system incorporated into the platen cover), which, when opened, may expose a user to light from the scan carriage. Optionally, the access panel(s) 190 can also be operatively connected to the scan carriage 130 so that the scan carriage 130 automatically scans the document in the first scan mode, as discussed above, when both the following conditions occur: (1) the platen cover is in the first position (e.g., closed) and (2) all of the access panels are also closed and so that the scan carriage automatically scans the document in the second scan mode, as discussed above, when either one of the following conditions occur: (1) the platen cover is in the second position (e.g., at least partially opened) or (2) any of the access panels are opened. As with the platen cover, a detection system 191 for each access panel 190 can comprise a switch or optical or mechanical sensor that detects the position of the access panel 190 (e.g., as opened or closed) and that further communicates the detected position to the scan carriage 130 in order to enable either the first scan mode or the second scan mode, as appropriate, to prevent vision damage and/or discomfort when a user may be exposed to light from the scan carriage 130.

It should be understood that by incorporating into the document scanner 100 a variable power supply 136 that allows the light intensity level to be selectively varied between multiple different intensity levels (i.e., more than two different intensity levels) and a variable drive motor 135 that allows the scan rate to be selectively between multiple different scan rates (i.e., more than two different scan rates), the present invention allows a user to selectively adjust the scan modes and, particularly, the light intensity level and scan rate for both the first and second modes, as discussed above. Thus, the light intensity level and scan rate for each mode can be selectively adjusted based on the currently established safety and/or comfort standards (e.g., current laws and/or recommendations established to prevent vision damage and/or discomfort), the customer requirements (e.g., as to image resolution), the operating environment, the operating conditions, etc.

The above-described document scanner 100 can comprise a stand-alone unit that is, for example, in communication with an external computer so that once scanning functions are performed, the resulting digital data can be output to that computer for further processing. Alternatively, this document scanner 100 can be incorporated into a multi-function image processing system, such as a digital copier or a an "all-in-one" printer, that performs scanning functions and further processes the resulting digital data (e.g., outputs printed copies of digital images, faxes copies of the digital images, etc.).

Figure 3:
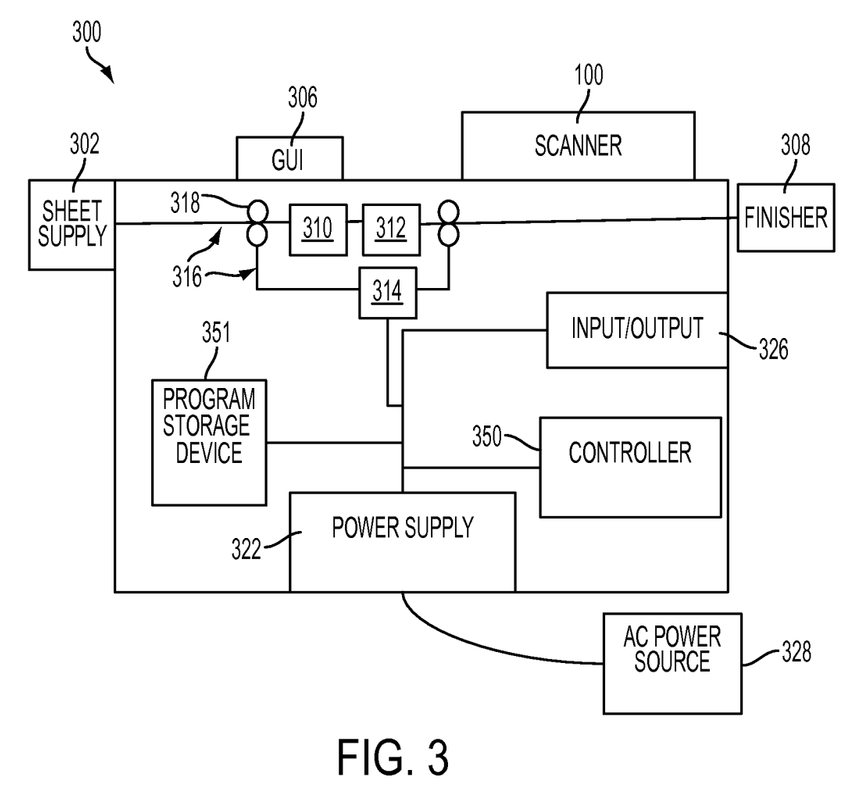
FIG. 3 is a schematic drawing illustrating an exemplary multi-function image processing system that can incorporate the document scanner of FIGS. 2A-2B.

For example, as illustrated in FIG. 3, a multi-function image processing system 300 can comprise a document scanner 100, at least one marking device (printing engines) 310, 312, 314, a sheet supply and feeding system 302, a sheet transport path 316 incorporating sheet transport devices 318, an optional finisher 308, a graphical user interface (GUI) 306, an internal power supply 322 connected to an alternating current (A/C) external power supply 328, a communications port (input/output) 326 and a controller 350 operatively connected to each of the other components. In such a multi-function image processing system 300, the document scanner 100 can scan a document, as discussed in detail above. Following the scan process, the sheet supply and feeding system 302 can transport a print media sheet to the sheet transport path 316. Transport devices 318 can then transport the print media sheet through marking engine(s) 310, 312, 314. The marking engines 310, 312, 314 can reproduce the digital image defined during scanning on the print media sheet. Once marking is complete, the transport devices 318 can continue to transport the print media sheet to an output tray or, optionally, to a finisher 308 which can fold, staple, sort, etc., printed sheets. Input/output device 326 can be used for communications between the multi-function image processing system 300 and other devices (e.g., an external computerized network). Each of the system 300 components can be controlled by the controller 350 and powered by the internal power supply 322, which can receive AC power from the external power supply 328 and can convert it to DC power, as necessary. It should be understood that in the case where the document scanner 100 is incorporated into a multi-function image processing system 100, the controller 150 for the document scanner 100 can comprise the same controller 350 that controls operation of the other system components. Additionally, it should be understood that the above-described multi-function image processing system 300 is offered for illustration purposes and is just one example of an image processing system that can incorporate the document scanner 100 of the present invention. The document scanner 100 can, alternatively, be incorporated into any other multi-function image processing system having a document scanning function.

Figure 4:
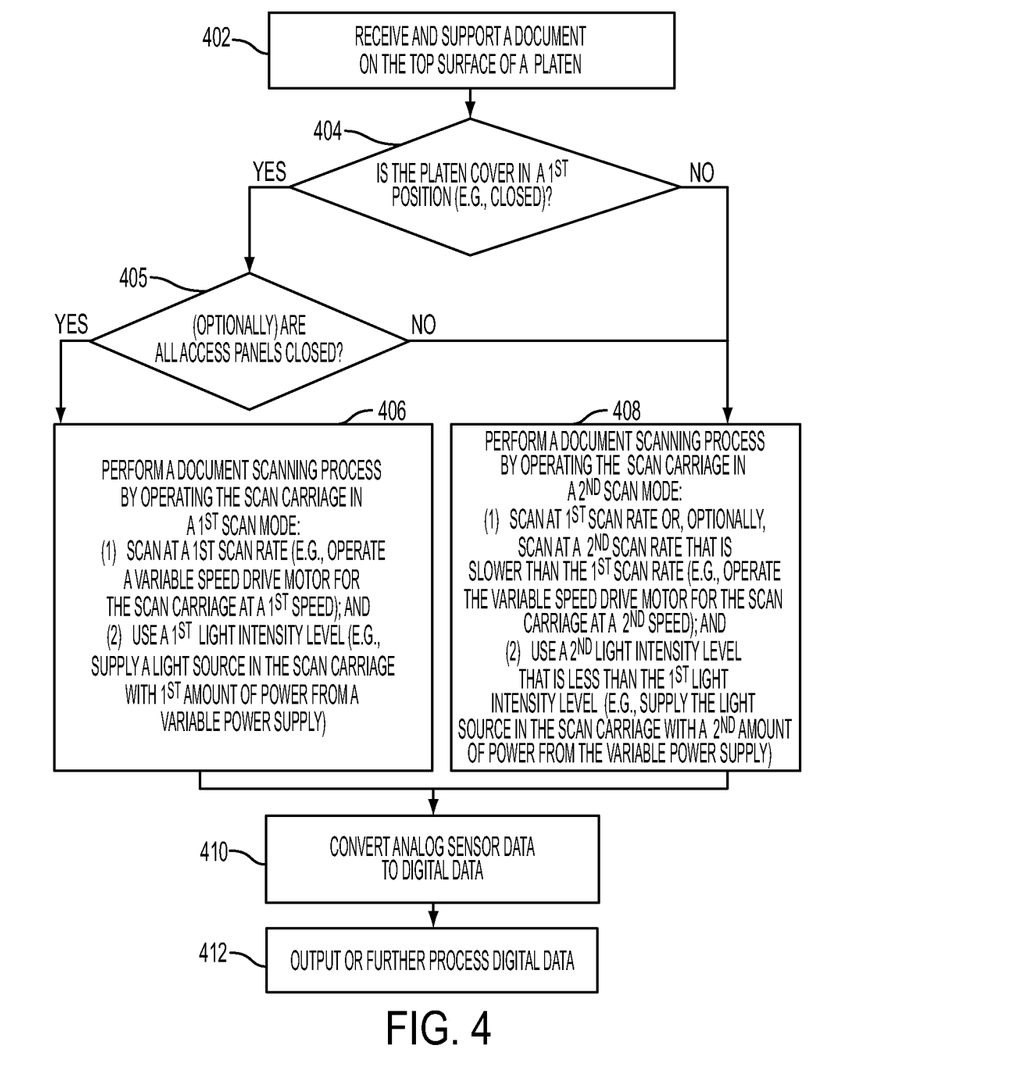
FIG. 4 is a flow diagram illustrating an embodiment of a method of operating a document scanner.

Referring to FIG. 4, also disclosed herein are embodiments of a method of operating a document scanner 100, such as that described in detail above and illustrated in FIGS. 2A-2B. The method embodiments can comprise receiving a document (e.g., 160a or 160b) to be scanned and supporting that document on the top surface 172 of the platen 170 such that the text and/or images to be scanned are immediately adjacent to the platen 170 (402). At process 402, a document can be received automatically from a document handling system 115, which feeds sheets individually onto and off of the top surface 172 of the platen 170 for scanning. Alternatively, a document can be received when a user manually lifts the platen cover 110 and places the document to be scanned on the top surface 172 of the platen 170 for scanning.

Next, the method can comprise receiving (e.g., by a controller 150) an indication of a detected position of the platen cover 110 relative to the platen 170 (404) and automatically performing a document scanning process in an appropriate scan mode based on that detected position of the platen cover 110 (406-408).

Specifically, the method can comprise detecting, e.g., by a detection system 120 (e.g., by a switch or optical or mechanical sensor, as discussed above), whether the platen cover 110 is in a first position or a second position different from the first position. As shown in FIG. 2A, the first position can be when the platen cover 110 is closed over the document 160a such that it is essentially parallel to the platen 170. This first position can be associated with operation of the document handling system 115, which, as discussed above, feeds sheets individually onto and off of the platen 170 for scanning. This first position can also be associated with a user manually placing a single sheet or a relatively thin stack of sheets (e.g., a few documents stapled together) on the platen 170 and closing it. In this case, the position of the platen cover 110 is sufficient to protect a user from exposure to light and, particularly, high intensity light. As shown in FIG. 2B, the second position can be when the platen cover 110 is at least partially opened such that the platen cover 110 is angled (e.g., at 5 degrees 10 degrees, 25 degrees, 45 degrees, 90 degrees, etc.) relative to the platen 170. This second position can be associated with a user manually placing an open book, as shown, or a relatively thick stack of sheets on the platen 170 and attempting to close it. In this case, the position of the platen cover 110 may be insufficient to protect a user from exposure to light and, particularly, high intensity light (e.g., up to or greater than 150,000 lux), which at even short exposure times can cause vision damage during scanning.

Once the position of the platen cover is detected, an enable signal can be transmitted by the detection system 120 to the controller 150 in order to initiate document scanning in an appropriate scan mode. Specifically, the method can comprise automatically scanning the document in a first scan mode when the detected position is the first position (e.g., closed) (406) or in a second scan mode different from the first scan mode when the detected position is the second position (e.g., at least partially opened) (408). For example, the first scan mode can comprise a default scan mode (i.e., the mode that is used absent instructions to the contrary) and the process 404 of receiving an indication of the position of the platen cover 110 can comprise receiving (e.g., by the controller 150) an enable signal triggered by the detection system 120 when the platen cover 110 is in the second position (e.g., at least partially opened). Based on this enable signal, the controller 150 can initiate process 408, whereby the document 160b is automatically scanned by the scan carriage 130 in the second scan mode. Alternatively, the second scan mode can comprise the default scan mode (i.e., the mode that is used absent instructions to the contrary) and the process 404 of receiving an indication of the position of the platen cover 110 can comprise receiving (e.g., by the controller 150) an enable signal triggered by the detection system 120 when the platen cover 110 is the first position (e.g., closed). Based on this enable signal, the controller 150 can initiate process 406, whereby the document 160a is automatically scanned by the scan carriage 130 in the first scan mode.

As discussed in detail above, the document scanning process can comprise moving a scan carriage 130, which is driven by a drive motor 135 and supported by parallel supports, along the bottom surface 171 of the platen 170 opposite the document (e.g., 160a or 160b). As the scan carriage moves passed the document, the document and, particularly, the images and/or text thereon can be illuminated by a light source 131 (E.g., a light emitting diode (LED) light source) in the scan carriage 130. Next, the intensity of light as reflected back from given areas of the document can be measured by an image sensor 132 in the scan carriage and, particularly, by an array of photosensitive devices (e.g., photodiodes or other photosensitive devices). The different scan modes can define the scanning process specifications to be used and, specifically, can require the scan carriage 130 component of the document scanner 100 to illuminate the document at specific light intensity levels and to move at a specific scan rate.

For example, the process 406 of scanning a document in the first scan mode, which can be automatically initiated when the platen cover is in the first position (e.g., closed, as shown in FIG. 2A), can require the scan carriage 130 to illuminate the document 160a at a first light intensity level and to move along the bottom surface 171 of the platen 170 at a first scan rate. Since the platen cover 110 is in the closed position and, thereby limits user exposure to light during scanning, the first scan mode can, for example, correspond to the scan operation performed by newer technology high-speed, high-resolution, document scanners. Thus, in one exemplary embodiment, the first scan mode can require a first scan rate of approximately 120 sheets per minute (or 1 sheet per half second) and further require a light intensity level of approximately 150,000 lux. However, it should be understood that the first scan mode may alternatively require a first scan rate that is faster or slower than 120 sheets per minute and/or a first light intensity level that is higher or lower than 150,000 lux. Thus, the process 406 of automatically scanning the document 160a in the first scan mode can comprise, for example, supplying the light source 131 in the scan carriage 130 with a first amount of power from a variable power supply 136 in order to achieve the first light intensity level and further operating a drive motor 135 (e.g., a variable drive motor) for the scan carriage 130 at a first operating speed in order to achieve the first scan rate.

On the other hand, the process 408 of scanning a document in the second scan mode, which can be automatically initiated when the platen cover 110 is in the second position (e.g., at least partially opened, as shown in FIG. 2B), can require the scan carriage 130 to illuminate the document 160b at a second light intensity level that is less than the first light intensity level. Since the platen cover 110 is in the opened position and, thereby may allow a user to be exposed to light during scanning, the second scan mode should meet pre-established standards for light intensity level to user exposure time to prevent vision damage and/or discomfort. It should be noted that such pre-established standards may, for example, be legal requirements and/or recommendations generated by one or more governmental agencies (e.g., Occupational Safety and Health Administration (OSHA), National Eye Institute (NEI) of the National Institutes of Health (NIH), etc.) or a private or non-profit organization (e.g., American Optometric Association). In addition, the second scan mode can require the scan carriage 130 to move either at the same first scan rate at the expense of image resolution (i.e., accepting a reduction in signal to noise) or, optionally, to move at a second scan rate that is slower than the first scan rate in order to compensate for the decrease in light intensity and, thereby achieve essentially the same image resolution. Thus, in one exemplary embodiment, the second scan mode can require a second scan rate of approximately 60 sheets per minute (or 1 sheet per second) and further require a light intensity level of approximately 30,000 lux, which as illustrated in FIG. 1 is currently accepted as being within established safety standards. However, it should be understood that the second scan mode may alternatively require a second scan rate that is faster or slower than 60 sheets per minute and/or a second light intensity level that is higher or lower than 30,000 lux (e.g., if within established safety standards). Thus, the process 408 of automatically scanning the document 160b in the second scan mode can comprise supplying the light source 131 with a second amount of power from the variable power supply 136, the second amount of power being less than the first amount of power in order to achieve the second light intensity level and, optionally, operating the variable drive motor 135 at a second operating speed that is slower than the first operating speed in order to achieve the second scan rate.

Once acquired, image sensor data can be translated from analog to digital (e.g., by a discrete processor 140 or by the controller 150), thereby defining the picture elements (i.e., pixels) of the document being scanned (410). Combined these pixels represent the document in electronic form. If the document scanner 100 is a stand-alone unit, the resulting digital data can be output to a computer for further processing (412). Alternatively, if the document scanner 100 is incorporated into a multi-function image processing system, the resulting digital data can be further processed within the system (e.g., to generate printed copies of the document, to fax digital copies of the document, etc.) (412).

Optionally, the method can further comprise receiving another indication that an access panel 190 for the document scanner 100 (e.g., an access panel in the frame 105, as shown, and/or in the document handling system 115) is either closed or opened (405). Such an access panel 190, when opened, may similarly expose a user to light from the scan carriage. In this case, the process of automatically scanning the document can comprise automatically scanning the document in the first scan mode at process 406, as discussed above, when both the following conditions occur: (1) the platen cover is in the first position (e.g., closed) and (2) the access panel is closed and automatically scanning the document in the second scan mode at process 408, as discussed above, when either one of the following conditions occur: (1) the platen cover is in the second position (e.g., at least partially opened) and (2) the access panel is opened. Specifically, the method can optionally further comprise detecting (e.g., by an additional detection system 191, such an additional switch or optical or mechanical sensor) the position of an access panel 190 (e.g., closed or open) and further communicating that detected position to the scan carriage 130 in order to enable either the first scan mode or the second scan mode, as appropriate, to prevent vision damage and/or discomfort when a user may be exposed to light from the scan carriage 130.

It should be understood that by incorporating into the document scanner 100 a variable power supply 136 that allows the light intensity level to be selectively varied between multiple different intensity levels (i.e., more than two different intensity levels) and a variable drive motor 135 that allows the scan rate to be selectively between multiple different scan rates (i.e., more than two different scan rates), the present invention allows a user to selectively adjust the scan modes and, particularly, the light intensity level and scan rate for both the first and second modes, as discussed above. Thus, the light intensity level and scan rate for each mode can be selectively adjusted at processes 406 and 408 based on the currently established safety and/or comfort standards (e.g., current laws and/or recommendations established to prevent vision damage and/or discomfort), the customer requirements (e.g., as to image resolution), the operating environment, the operating conditions, etc.

Also disclosed herein are embodiments of a computer program product for performing the above-described method of operating the document scanner 100. In one embodiment the computer program product can comprise a non-transitory program storage device (see item 151 of FIGS. 2A-2B or item 351 of FIG. 3). Specifically, this program storage device 151, 351 can comprise a tangible computer-usable (i.e., computer-readable) medium on which a computer-useable (i.e., computer-readable) program code (e.g., a control program, a set of executable instructions, etc.) is recorded. The tangible computer-usable medium can comprise a memory device, such as a floppy disk, a flexible disk, a hard disk, a magnetic tape, any other magnetic storage medium, a CD-ROM, a DVD, any other optical storage medium, a RAM, a PROM, an EPROM, a FLASH-EPROM, or any other memory chip or cartridge. This tangible computer-useable medium can be read by a computer and, particularly, by the controller 150 or 350, which can execute the program code recorded thereon in order to perform the method of operating the document scanner 100, as described in detail above. In another embodiment, the computer program product can comprise a transmission medium comprising a transmission carrier wave (e.g., acoustic or light waves generated during radio wave or infrared data communications, respectively). The transmission medium can embody the computer-useable (i.e., computer-readable) program code (e.g., a control program, a set of executable instructions, etc.) as a data signal that is readable by a computer and, particularly, by the controller 150 or 350, which can execute the program code in order to perform the method of operating the document scanner 100, as described in detail above.

Many computerized devices are discussed above. Computerized devices that include chip-based central processing units (CPU's), input/output devices (including graphic user interfaces (GUI), memories, comparators, processors, etc. are well-known and readily available devices produced by a variety of manufacturers, including but not limited to, Dell Computers, Round Rock Tex., USA and Apple Computer Co., Cupertino Calif., USA. Such computerized devices commonly include input/output devices, power supplies, processors, electronic storage memories, wiring, etc., the details of which are omitted here from to allow the reader to focus on the salient aspects of the embodiments described herein. Similarly, peripheral equipment for computerized devices are available from a variety of manufacturers, including but not limited to, Xerox Corporation, Norwalk, Conn., USA, and the details of such peripheral equipment are not discussed herein for purposes of brevity and reader focus.

It should be understood that the terminology used herein is for the purpose of describing particular embodiments only and is not intended to be limiting of the invention. The terms printer or printing device as used herein encompass any apparatus, such as a digital copier, bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 6,032,004, the complete disclosure of which is fully incorporated herein by reference. All foregoing embodiments are specifically applicable to electrostatographic and/or xerographic machines and/or processes. In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Furthermore, as used herein, the singular forms "a", "an" and "the" are intended to include the plural forms as well, unless the context clearly indicates otherwise. Finally, as used in herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof.

It should further be understood that the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments described herein were chosen in order to best explain the principles of the invention and the practical application, and to enable others of ordinary skill in the art to understand the invention for various embodiments with various modifications as are suited to the particular use contemplated. The embodiments described herein and other features and functions, or alternatives thereof, may be desirably combined into many other different systems or applications. Furthermore, various presently unforeseen or unanticipated alternatives, modifications, variations, or improvements to the embodiments described herein may subsequently be made by those skilled in the art. Such alternatives, modifications, etc. are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

Therefore, disclosed above are embodiments of a high speed, high resolution, document scanner wherein the scan mode and, more particularly, the light intensity level to scan rate setting, of the document scanner is automatically adjusted, as necessary, to fall within legal requirements and/or recommendations established to prevent vision damage and/or discomfort and to still allow for high-resolution scanning. The objective is to reduce the intensity of stray light to safe levels for operators and passer by's while preserving the image quality. Specifically, in the embodiments of the document scanner, the platen cover can be operatively connected to the scan carriage such that the mode at which the scan carriage operates depends upon the detected position of the platen cover. For example, when the platen cover is closed, the scan carriage can automatically illuminate the document being scanned at a relatively high light intensity level and can move at a relatively fast speed. However, when the platen cover is opened, the scan carriage can automatically illuminate the document being scanned at a lower light intensity level and, optionally, in order to compensate for the lower light intensity level and achieve essentially the same high resolution, can move at a slower speed. Also disclosed herein are embodiments of an associated method of operating a scanner and a program storage device.

What is claimed is:

1. A document scanner comprising:
   a platen on a frame, said platen having a top surface for supporting a document and a bottom surface opposite said top surface;
   a scan carriage movably mounted within said frame adjacent to said bottom surface of said platen, said scan carriage scanning said document; and
   a platen cover pivotably mounted to said frame and operatively connected to said scan carriage so that said scan carriage automatically scans said document in a first scan mode when said platen cover is in a first position relative to said platen and automatically scans said document in a second scan mode different from said first scan mode when said platen cover is in a second position relative to said platen,
   said scan carriage comprising a light source that receives different amounts of power during said first scan mode and said second scan mode such that, during said first scan mode, a first light intensity level is achieved and such that, during said second scan mode, a second light intensity level that is different from said first light intensity level is achieved.

2. The document scanner of claim 1, further comprising a detection system detecting a position of said platen cover relative to said platen and communicating said position to said scan carriage to enable one of said first scan mode and said second scan mode.

3. The document scanner of claim 2, said first scan mode comprising a default scan mode and said detection system comprising any one of a switch and a sensor that is activated when said platen cover is in said second position and triggers transmission of an enable signal to initiate said second scan mode.

4. The document scanner of claim 2, said second scan mode comprising a default scan mode and said detection system comprising any one of a switch and a sensor that is activated when said platen cover is in said first position and triggers transmission of an enable signal that initiates said first scan mode.

5. The document scanner of claim 1,
said first position being closed over said document such that said platen cover is essentially parallel to said platen,
said second position being at least partially opened such that said platen cover is angled relative to said platen, and
said second light intensity level being less than said first light intensity level.

6. The document scanner of claim 5, said second light intensity level being an acceptable light intensity level for user exposure according to pre-established standards.

7. The document scanner of claim 5,
said first scan mode further requiring a first scan rate, and
said second scan mode further requiring one of said first scan rate and a second scan rate that is slower than said first scan rate.

8. The document scanner of claim 7, said scan carriage having a variable speed drive motor and said light source being connected to a variable power supply,
said light source receiving, from said variable power supply, one of a first amount of power in order to achieve said first light intensity level in said first scan mode and a second amount of power that is less than said first amount of power in order to achieve said second light intensity level in said second scan mode, and
said variable speed drive motor operating at one of a first operating speed in order to achieve said first scan rate in said first scan mode and a second operating speed that is less than said first operating speed in order to achieve said second scan rate in said second scan mode.

9. The document scanner of claim 1, further comprising an access panel operatively connected to said scan carriage so that said scan carriage automatically scans said document in said first scan mode when both the following conditions occur: said platen cover is in said first position and said access panel is closed and so that said scan carriage automatically scans said document in said second scan mode different from said first scan mode when any one of the following conditions occur: said platen cover is in said second position and said access panel is opened.

10. A method of operating a document scanner, said method comprising:
receiving an indication of a detected position of a platen cover relative to a platen that supports a document to be scanned by said document scanner, said detected position being one of a first position and a second position different from said first position; and,
automatically scanning said document in a first scan mode when said detected position is said first position and in a second scan mode different from said first scan mode when said detected position is said second position, said automatically scanning comprising receiving, by a light source of a scan carriage of said document scanner, different amounts of power during said first scan mode and said second scan mode such that, during said first scan mode, a first light intensity level is achieved and such that, during said second scan mode, a second light intensity level that is different from said first light intensity level is achieved.

11. The method of claim 10, said first scan mode comprising a default scan mode and said receiving of said indication comprising receiving an enable signal triggered by a detection system when said platen cover is in said second position in order to initiate said second scan mode.

12. The method of claim 10, said second scan mode comprising a default scan mode and said receiving of said indication comprising receiving an enable signal triggered by a detection system when said platen cover is in said first position in order to initiate said first scan mode.

13. The method of claim 10,
said first position being closed over said document such that said platen cover is essentially parallel to said plate,
said second position being at least partially opened such that said platen cover is angled relative to said platen, and
said second light intensity level being less than said first light intensity level.

14. The method of claim 13, said second light intensity level being an acceptable light intensity level for user exposure according to pre-established standards.

15. The method of claim 13,
said first scan mode requiring a scan carriage to move along a bottom surface of said platen at a first scan rate, and
said second scan mode requiring said scan carriage to move along said bottom surface of said platen at one of said first scan rate and a second scan rate that is slower than said first scan rate.

16. The method of claim 15,
said automatically scanning in said first scan mode comprising supplying said light source in said scan carriage with a first amount of power from a variable power supply in order to achieve said first light intensity level and further selectively operating a variable drive motor for said scan carriage at a first operating speed in order to achieve said first scan rate, and
said automatically scanning in said second scan mode comprising supplying said light source with a second amount of power from said variable power supply, said second amount of power being less than said first amount of power in order to achieve said second light intensity level, and further selectively operating said variable drive motor at a second operating speed that is slower than said first operating speed in order to achieve said second scan rate.

17. The method of claim 10, further comprising receiving another indication that an access panel for said document scanner is any one of closed and opened and said automatically scanning comprising:
automatically scanning said document in said first scan mode when both the following conditions occur: said platen cover is in said first position and said access panel is closed; and,
automatically scanning said document in said second scan mode different from said first scan mode when any one of the following conditions occur: said platen cover is in said second position and said access panel is opened.

18. A non-transitory program storage device readable by a computer and tangibly embodying a program of instructions executable by said computer to perform a method of operating a document scanner, said method comprising:
receiving an indication of a detected position of a platen cover relative to a platen that supports a document to be scanned by said document scanner, said detected position being one of a first position and a second position different from said first position; and
automatically scanning said document in a first scan mode when said detected position is said first position and in a second scan mode different from said first scan mode when said detected position is said second position, said automatically scanning comprising receiving, by a light source of said document scanner, different amounts of power during said first scan mode and said second scan mode such that, during said first scan mode, a first light intensity level is achieved and such that, during said second scan mode, a second light intensity level that is different from said first light intensity level is achieved.

19. The program storage device of claim 18, said first position being closed over said document such that said platen cover is essentially parallel to said platen, said second position being at least partially opened such that said platen cover is angled relative to said platen, and said second light intensity level being less than said first light intensity level.

20. The method of claim 18, said first scan mode requiring a scan carriage to move along a bottom surface of said platen at a first scan rate, and said second scan mode requiring said scan carriage to move along said bottom surface of said platen at one of said first scan rate and a second scan rate that is slower than said first scan rate.

* * * * *